July 12, 1955
G. P. HERRICK
2,712,911
CONVERTIBLE AIRCRAFT
Filed March 1, 1951
3 Sheets-Sheet 1
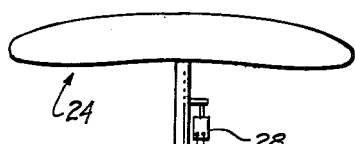
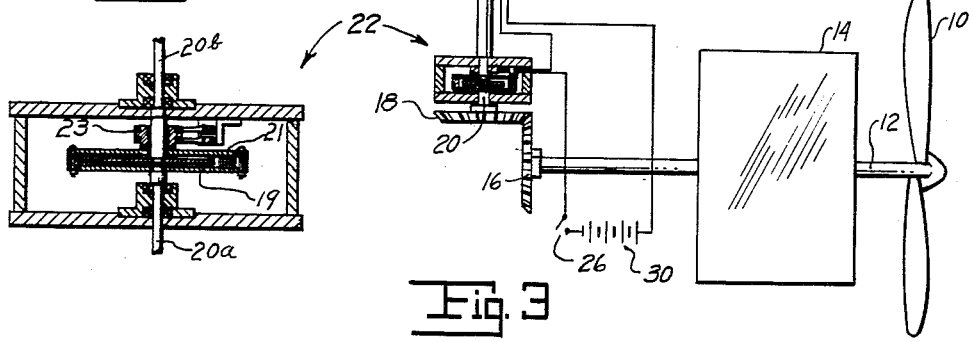
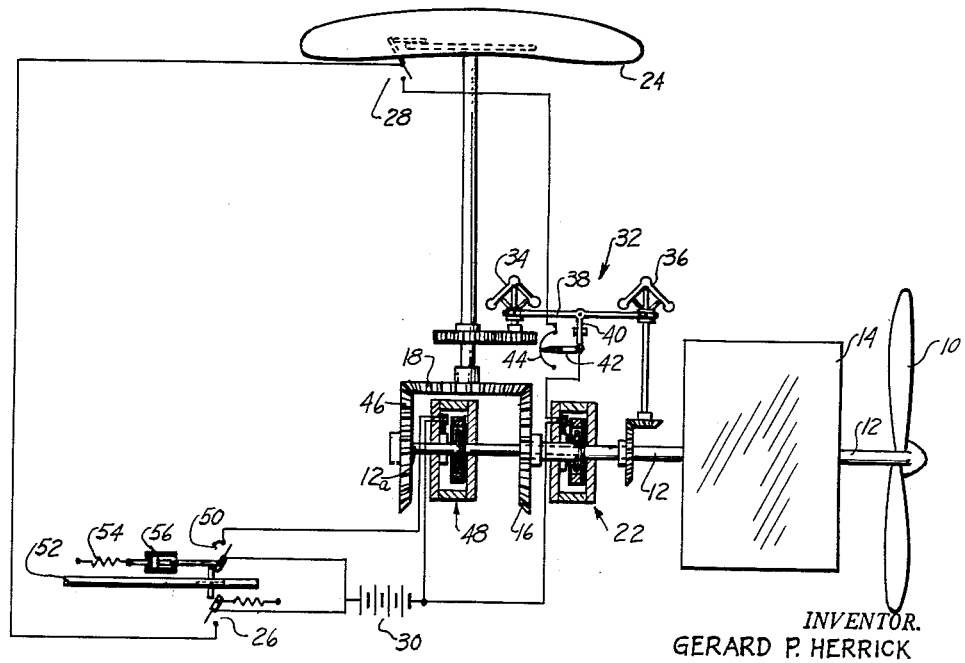
INVENTOR.
GERARD P. HERRICK
BY July 12, 1955

G. P. HERRICK 2,712,911

CONVERTIBLE AIRCRAFT

Filed March 1, 1951

INVENTOR.
GERARD P. HERRICK
BY

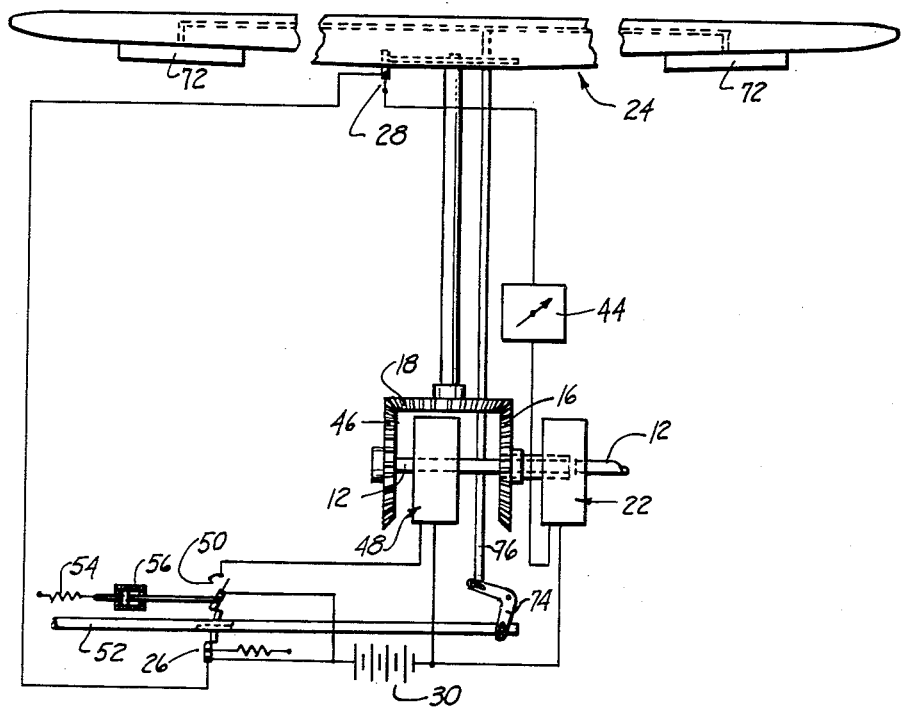
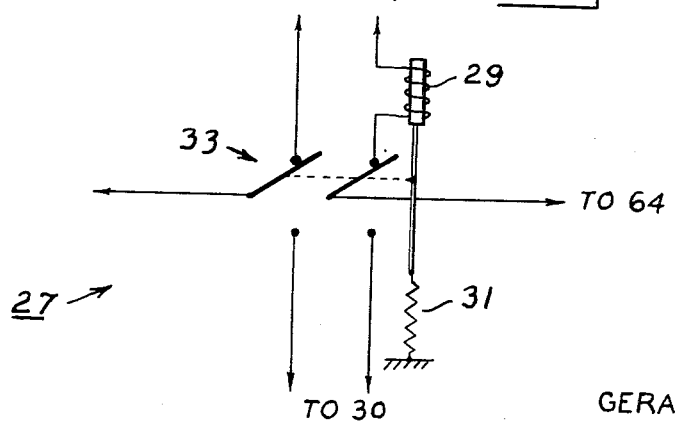

United States Patent Office 2,712,911
Patented July 12, 1955

2,712,911

CONVERTIBLE AIRCRAFT

Gerard P. Herrick, New York, N. Y.

Application March 1, 1951, Serial No. 213,355

10 Claims. (Cl. 244—7)

This invention relates to improvements in aircraft of the type convertible from fixed-wing flight to rotating wing flight and vice versa. Aircraft of the type indicated are described in more detail in my prior patents, Nos. 2,518,007 and 2,518,008.

More specifically, this invention is directed to improved means for effecting the conversion of a convertible aircraft from rotating wing flight to fixed-wing flight and vice versa. Since an aircraft of this type actually changes its means of lift in mid air, it is obvious that this conversion should take place as rapidly and smoothly as possible. In converting from rotating to fixed-wing flight, the rotor-wing must not only be stopped but also must be properly oriented. In my above patents, I disclose a method of positively orienting the rotor whereby after the rotor is initially stopped, it is rotated in reverse through an angle from between approximately 10 to 190° until the properly orienting fixer is engaged. Thus a means of smoothly and quickly stopping, reversing, and orienting the rotorwing, all in one operation, is required.

In the past it has been proposed to use rotating torque-resisting elements such as band brakes or aerodynamic "spoiler" brakes with some means of storing the rotational energy of the rotorwing as it is stopped to drive it in reverse for fixing. The present invention is directed, in one of its aspects, toward an improved system for controlling rotorwings of the type described above.

I have now realized that this may be efficiently accomplished by employing two oppositely rotating elements adapted to be operatively engaged, one connected to the rotatable lifting surface and the other to a primary power plant. More particularly, I utilized a clutch primarily for its slipping braking torque and secondarily for its driving torque, contrary to the usual usage, to transmit the primary power plant braking-driving torque to the lift producing means. By using the oppositely rotating power plant as a source of braking power with a slipping clutch to transmit the power to the rotorwing, a braking force that automatically and smoothly converts into a driving force can be obtained.

In one of its broader aspects this invention may be said to lie in transmitting the braking or driving force derived from an independent power plant to a rotatable wing or other form of aerodynamic lift producing means by a clutch whose torque relationships are controllable by the intensity of the antirotating stress between the clutch elements, i. e., the electromagnetic field of the so-called slipping magnetic clutch. A further aspect may be said to be in utilizing a slipping clutch in combination with an aerodynamic-spoiler braking system to provide a smooth, fast and positive braking and orienting of the lift producing means. Other aspects and features of the invention will be in part obvious and in part pointed out as this specification proceeds.

The invention may be more fully described and understood by reference to the drawings wherein:

Figure 1 is a diagrammatic view of a specific embodiment of this invention showing the relative arrangement of independent power plant, rotatable wing and its driveshaft and a connecting magnetic clutch for stopping and reversing;

Figure 2 is a detail sectional view of the magnetic clutch shown in Figure 1;

Figure 3 is a diagrammatic view of another embodiment of the invention wherein is particularly shown an additional magnetic clutch usable for starting the rotation of the wing, as well as a differential governor control for maintaining substantially constant braking torque in a clutch of the type wherein the torque varies with the relative speed of its elements;

Figure 6 shows a combination of an aerodynamic braking system with a slipping clutch braking system.

Figure 7 shows details of an interlock switch included in Figure 4, shown on enlarged scale.

Figure 4:
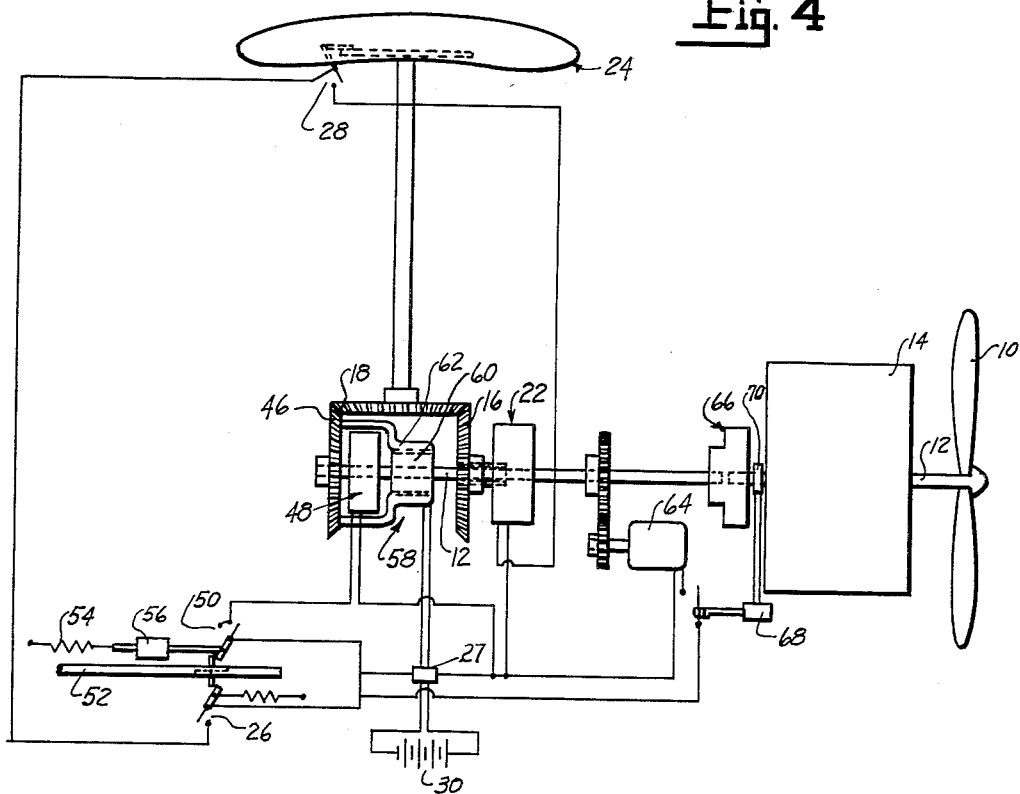
Figure 4 is a diagrammatic view of still another embodiment of this invention showing electrical means for maintaining substantially constant braking torque, and an alternate source of driving-braking energy.

More particularly in the drawings, referring to Figure 1, a propeller 10 is mounted on shaft 12 which is driven by engine 14. Shaft 12 is also connected to bevel gear 16 so as to drive bevel gear 18 and clutch shaft 20 which in turn drives one element 21 of braking-driving-slipping magnetic clutch 22. The other element 19 of clutch 22 is connected to rotorwing 24 which normally when braking, rotates in such a direction that the two clutch elements 19 and 21 rotate in opposite directions. Slipping magnetic clutch 22 is controlled by switch 26, through normally closed interlock switch 28 and battery 30 and its associated circuit. In operation switch 26 is actuated by the convertaplane conversion (unified control) lever (not shown) to close the circuit through interlock 28 which is normally closed when the rotorwing is rotating. For a complete and detailed description of an aircraft and control system therefor to which the present invention is particularly applicable reference is hereby made to my copending application Serial No. 43,729 filed August 11, 1948, for Convertible Aircraft particularly for the details of the conversion lever and rotating control mentioned herein. This energizes the braking clutch which brings the rotorwing to a stop and then in the same operation reverses the rotorwing, since the clutch is still energized and the engine still running. This reversing causes a fixing stop to be engaged upon a reverse rotation of from about 10 to 190° depending upon where in relation to the longitudinal axis of the plane the rotorwing stops, which orients the rotorwing and opens interlock 28 to de-energize the clutch as described more particularly in my aforementioned patents and application.

Figure 5:
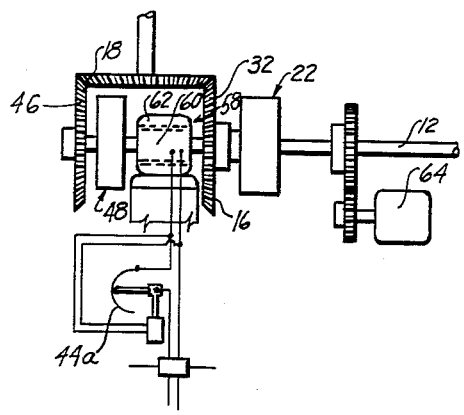
Figure 5 is a diagrammatic view of means for maintaining a constant magnetic field for those types of slipping clutches wherein the torque does not vary with the relative speed of its elements.

In order to ensure that no more reactionary force is exerted on the fuselage than can be conveniently and safely controlled by the rudder, it is important to control the degree of effective braking torque. Slipping clutches wherein the torque does not vary with the relative speed of the slipping elements are described herein. For example, a magnetic clutch with a constant magnetic clutch field of a predetermined value is sufficient and may be provided as shown in Figure 5. In Figure 5 armature 60 of generator 58 is connected to shaft 12 with the stator 62 mounted on the airframe. Since the armature is fixed on shaft 12 a voltage, proportional to the main power plant speed, is developed by the resultant rotation through the stator field. By maintaining the power plant speed constant throughout the braking cycle a constant voltage is obtained which is applied to clutch 22 through proper controlling resistance 44a. Thus a constant effective torque is obtained with a constant torque magnetic fluid clutch.

However, in some clutches, the torque varies with the relative speed of the slipping elements. Accordingly, if such a clutch is to be used, the braking clutch 22 is provided with a differential governor assembly 32 (Figure 3). This includes for example, governor 34, rotating according to the speed of the rotorwing, and governor 36, rotating with engine shaft 12 which are joined by link 38 which is connected at its midpoint by link 40 to one end of the arm which is pivoted at 42, the rheostat 44 being in the control circuit of the braking clutch.

In the embodiment of Figure 3, one element of slipping clutch 22 is mounted on motor shaft 12 while the other element is mounted on the sleeve of bevel gear 16. Driving clutch 48 is inserted between bevel gears 16 and 46, its clutch elements being mounted on shafts 12 and 12a respectively. The rotorwing is connected directly to bevel gear 18. The bevel gear 16 with its sleeve is rotatably mounted on shaft 12 and gear 46 is fixed on shaft 12a.

In operation, the driving clutch 48 is energized through switch 50 which is actuated by conversion lever rod 52 when moved to the "helicopter" position. This connects the motor directly to bevel gear 46 which through bevel gear 18 drives the rotorwing. After a delay, introduced by spring 54 and air cylinder 56, sufficient to accelerate the rotorwing up to the operating espeed, switch 50 opens if other motive power, such as tip jets, is to be provided. When the craft is operating as a rotating wing craft, the wing 24 may be driven by means of the action of propeller 10 in pulling the aircraft through the air, as in an autogyro. In other words, the forward motion of the aircraft causes the wing 24 to rotate. Alternatively, the wing 24 may be driven by tip jets as set forth hereinabove, and as more fully disclosed in my co-pending application, Serial No. 43,729.

To stop rotation of the rotorwing, the conversion lever is moved to the "fixed wing" position so as to actuate switch 26 through conversion lever rod 52 which energizes the braking clutch 22 through rheostat 44 and switch 28.

Since in a preferred type of magnetic clutch, the torque is very nearly directly proportional, below saturation, to the current applied, and the control circuit shown is a series circuit, the amount of voltage applied to the braking clutch 22 (and hence the torque) is determined by the amount of resistance inserted by the rheostat, which in turn is controlled by the differential governor which reflects the relative speed of the rotorwing and motor as described above.

For example, as the rotorwing or engine speeds up the relative speed of the braking clutch elements increases, since the elements are rotating in opposite directions. At the same time, governor 34 or 36 necessarily rises causing, through links 38 and 40, more resistance to be inserted in the field circuit of the braking clutch and thus descreasing the current and so the braking torque due to the magnetic field, sufficiently to compensate for the gain of torque due to the speeding up of the relative speed of the clutch elements. Thus the magnetic field is controlled by the relative velocity of the rotorwing and motor to maintain the effective braking torque at a constant level that can be safely counteracted by the rudder.

Referring now to Figure 4, the governors 34 and 36 of Figure 3 are replaced by the generator 58 which includes armature 60 mounted on shaft 12 and field 62 mounted on bevel gear 46. In this arrangement, the armature and field are mounted so as to rotate in the same direction in normal forward operation with the clutch units 22 and 48 connected as in Figure 3. The voltage generated by this generator is used to control the braking clutch field through an emergency interlock type switch 27, as shown in Figure 7, where reduction in current from the generator 58 through the solenoid 29 allows the spring 31 to pull the switch arm 33 down so that it throws in the battery 30 when the generator fails. In this embodiment when the conversion rod 52 is moved to the "fixed wing" position from the "helicopter" position the clutch 48 is deenergized and the clutch 22 connected across the output of the generator 58. When the rotorwing is no longer positively driven it will start to slow down to auto rotating speed due to the inherent drag thus causing a voltage to be developed by generator 58. Here similar to the example above, as the rotorwing slows down further, the relative speed of the braking clutch elements decreases. However, since the engine is normally rotating faster than the rotorwing and in the same direction, the relative speed of rotation of the generator elements increases. Therefore as the voltage generated by a generator is proportional to the relative speed of rotation of its elements, the voltage generated increases which in turn increases the clutch magnetic field and thus compensates for the lost clutch torque. Thus a magnetic field proportional to the difference in speed of rotation of the motor and rotorwing is obtained which produces a constant effective torque that can be conveniently and safely counteracted by the rudder.

In this embodiment in the event the horizontal drive engine should start to slow down during this critical conversion period, the voltage output of the generator would decrease causing a decreased clutch magnetic field which in turn means a reduced braking torque and an increase or return to normal speed of the rotorwing. Thus, if the engine speed should start to fall below the safe level during the conversion period, the rotor would automatically be freed to rotate faster and prevent conversion below the safe speed. This process would be cumulative for as the rotorwing speeded up, less and less voltage would be generated until no braking torque at all would be applied. Thus, the pilot would have ample time to correct the difficulty or position the convertaplane in proper attitude to land safely.

An auxiliary motor 64 and overrunning clutch 66 are provided for emergency starting and stopping in case of main engine failure. The auxiliary motor is automatically started, upon engine failure, through a switch such as solenoid 68, normally energized by a winding 70 on the main engine shaft, while shaft 12 is similarly freed from the engine drive by overrunning clutch 66.

Referring to Figure 6, conversion lever rod 52 is shown in the braking position energizing braking clutch 22 through switch 26, rheostat 44 and interlock 28. In addition, rod 52 actuates, through link 74 and rod 76, a pair of airfoil brakes or "spoilers" 72 as described and claimed in my above copending application. These air brakes or "spoilers" interfere with the smooth wing profile and create a large air resistance or drag which by itself would tend to stop the rotation of the rotorwing. The combination of the air resistance braking with the slipping clutch braking, allow quick, smooth, and positive stopping of the rotorwing with equipment of minimum size and weight and without any complicated means of storing energy to drive the rotorwing in reverse after stopping as sometimes required heretofore.

A typical clutch of the type referred to herein is shown in Figure 2, in which shaft 20a is connected to driver element 19 and shaft 20b is connected to driven element 21. A magnetic coil 23 is provided adjacent the two rotating elements. The space between these two elements and surrounding driver element 19 may be advantageously filled with a medium of finely divided particles of iron, either in a dry state or immersed in a lubricant such as graphite or oil. It is also contemplated that this clutch may be of the eddy current type in which air is the filling medium.

It is understood that the particular embodiments shown are for exemplifying the principles of the invention and are not to be construed as limitations except as specifically set forth in the claims.

I claim:

1. In an aircraft, a lifting surface convertible from rotating to fixed position and vice versa, a primary power plant, a first slipping clutch for stopping and reversing rotation of said lifting surface having a first rotatable element connected to said power plant and a second rotatable element connected to said lifting surface for normal rotation opposite to said first element, a slipping clutch for starting rotation and driving of said lifting surface having a first rotatable element connected to said power plant and a second rotatable element connected to said lifting surface for normal rotation in the same direction, a control mechanism for selectively engaging said clutches between said primary power plant and lifting surface to transmit power from said power plant to said lifting surface.

2. An apparatus as described in claim 1 wherein both clutches are magnetic clutches including a driver element enclosed within a driven element filled with a mixture of iron filings and a lubricant.

3. An apparatus as described in claim 1 wherein said clutches are magnetic clutches including a driver element enclosed within an air filled driven element.

4. In an aircraft, a lifting surface convertible from rotating to fixed position and vice versa, a primary power plant, a slipping clutch operatively connected to transmit power from said power plant to said lifting surface for varying the rate of rotation of said lifting surface, a control mechanism connected to said primary power plant and coupled to said lift surface, thereby to measure the differential speed of rotation of said primary power plant and said lift surface for keeping the effective applied torque of said slipping clutch constant.

5. An apparatus as described in claim 4 wherein said control mechanism comprises a generator having a field rotating with the rotorwing and an armature rotating with the motor with the resultant output controlling the torque of said slipping clutch.

6. In an aircraft, a lifting surface convertible from rotating to fixed position and vice versa, a primary power plant, a slipping clutch having a first rotatable element operatively connected to said power plant and a second rotatable element connected to said lifting surface in a manner so as to normally rotate in a direction opposite to said first element for stopping and reversing the rotation of said lifting surface upon engagement of said elements, a second slipping clutch having a pair of rotatable elements operatively connected to said power plant and lifting surface for rotation in the same direction to transmit power from said power plant to said lifting surface for starting rotation of said lifting surface, means for selectively engaging said rotatable clutch elements, and a control mechanism connected to said power plant and responsive to the rotation of said lift surface for measuring the differential speed of rotation between said power plant and said lift surface for maintaining constant the effective braking torque of said first slipping clutch upon engagement thereof.

7. An apparatus as described in claim 6 wherein said control mechanism comprises a mechanical governor responsive to the rotation of said lifting surface, a second mechanical governor responsive to the rotation of said power plant, a differential link connecting both to the engaging means of said slipping clutch.

8. An apparatus as described in claim 6 wherein said control mechanism comprises a generator having a field rotating with the rotorwing and an armature rotating with the power plant rotating in the same direction as said field with the resultant output therefrom controlling said first slipping clutch engagement.

9. In an aircraft of the type having a rotatable lifting surface convertible from rotating to fixed position and vice versa, the combination of, a primary power plant, a slipping clutch having a first rotatable element connected to said power plant and a second rotatable element connected to the lifting surface in such a manner that it normally rotates in a direction opposite to said first element, and a control mechanism operatively associated with said first and second rotatable elements for operatively engaging said first and second elements whereby the normal rotation of said rotatable lifting surface is stopped and reversed.

10. Apparatus as described in claim 9 wherein said slipping clutch comprises a magnetic slipping clutch wherein said rotating elements are effectively engaged through a common magnetic field.

References Cited in the file of this patent

UNITED STATES PATENTS

| | | |
|---|---|---|
| 1,673,232 | Cierva | June 12, 1928 |
| 2,263,449 | Adler | Nov. 18, 1941 |
| 2,456,942 | Holbrook | Dec. 21, 1948 |
| 2,465,538 | Jensen | Mar. 29, 1949 |
| 2,488,079 | Savaud | Nov. 15, 1949 |

OTHER REFERENCES

"Technical News Bulletin," Bureau of Standards, vol. 34, No. 12, pp. 169–174, issue of December 1950.